Figure 1:
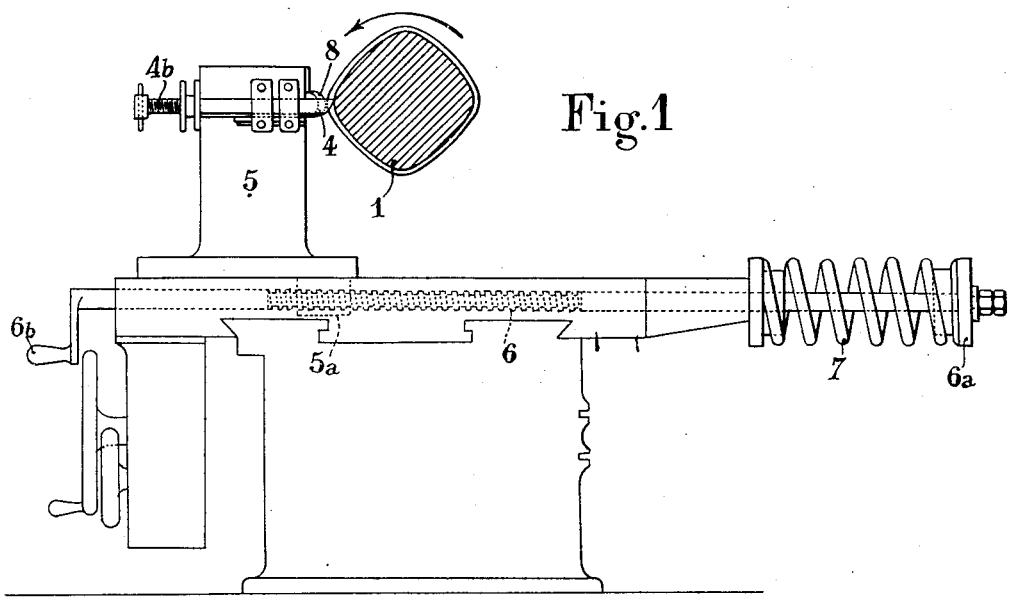

Oct. 9, 1934.  P. QUICHON  1,976,459

PROCESS FOR ROUGH TURNING IN THE LATHE OR SIMILAR MACHINE TOOL

Filed Dec. 7, 1932  2 Sheets-Sheet 1

P. Quichon
INVENTOR

By Marks & Clerk
ATTYS.

Oct. 9, 1934.  P. QUICHON  1,976,459
PROCESS FOR ROUGH TURNING IN THE LATHE OR SIMILAR MACHINE TOOL
Filed Dec. 7, 1932   2 Sheets-Sheet 2

P. Quichon
INVENTOR
By Marks & Clark
Attys.

Patented Oct. 9, 1934

1,976,459

UNITED STATES PATENT OFFICE 1,976,459

PROCESS FOR ROUGH TURNING IN THE LATHE OR SIMILAR MACHINE TOOL

Paul Quichon, Paris, France, assignor to Compagnie Des Forges De Chatillon Commentry & Neuves-Maisons, Paris, France Application December 7, 1932, Serial No. 646,195
In France November 2, 1932

4 Claims. (Cl. 82—14)

This invention has for its object a process allowing to easily and rapidly effect superficial rough turning of products made of metal or other substance, whether this operation is adapted to remove a certain thickness of material on the outer surface, or to eliminate defects in the material constituting the peripheral layer of the products.

Another advantage of the present process is that it is possible to carry it on most easily on any lathe or similar machine-tool, and it always operates in the best conditions, whatever may be the shape and dimensions of the product to be roughened out.

According to the invention, rough turning is ensured for instance by a lathe tool, in front of which the work to be roughened out is mounted as for an ordinary turning off operation. The tool-carrier is free to slide on the frame of the machine at right angles to the axis of rotation of the work, and it is constantly urged towards the latter by a suitably arranged returning device.

On the side of the tool, a roller or other suitable abutment member is mounted on the tool-carrier and bears on the surface of the work under the action of the above returning device.

This roller is placed in front of the tool, and, consequently, bears on a nonroughened out portion of the work, the position of the tool is adjusted in such a manner that it removes the superficial layer on the required depth.

A remarkable feature of the above described process is that the tool is automatically so guided as to remove a layer of a practically constant thickness—with the exception of unimportant local unevennesses in the surface of the member to work—this being done most easily and simply, without the help of any former, and even with a greater accuracy and less waste of metal than with such a former: it is in fact impossible that the shape of a former should exactly correspond to that of an ingot for instance, since the latter is very irregular.

Since the member to work guides the tool by itself according to the present process, all the drawbacks inherent to the use of an independent former are avoided.

Variations of tension of the returning device which, by way of example, can be constituted by a spring, due to the variations of radius of the work, have no influence on the working conditions of the tool, the tension of the returning device being partly absorbed by the roller bearing on the work.

Products of any shape can be roughened out according to this process, even those having a non rectilinear longitudinal axis; their straight section may also be of any shape, provided of course they do not present a too acute re-entering angle.

The lateral space necessarily existing between the roller and the tool prevents the roughing out of the entire surface of the work in a single cut. The invention provides a special arrangement, which will be described hereinafter, and by means of which the entire surface can be conveniently roughened out in two successive cuts, by effecting a very simple and rapid adjustment at the end of the first cut before effecting the second cut.

It is to be noted that instead of a lathe tool, use can be made of any other tool allowing to rough turn or to remove the burrs from the work, for instance a milling cutter, a grinding wheel, etc. . . . by providing for this tool any suitable drive.

Figure 2:
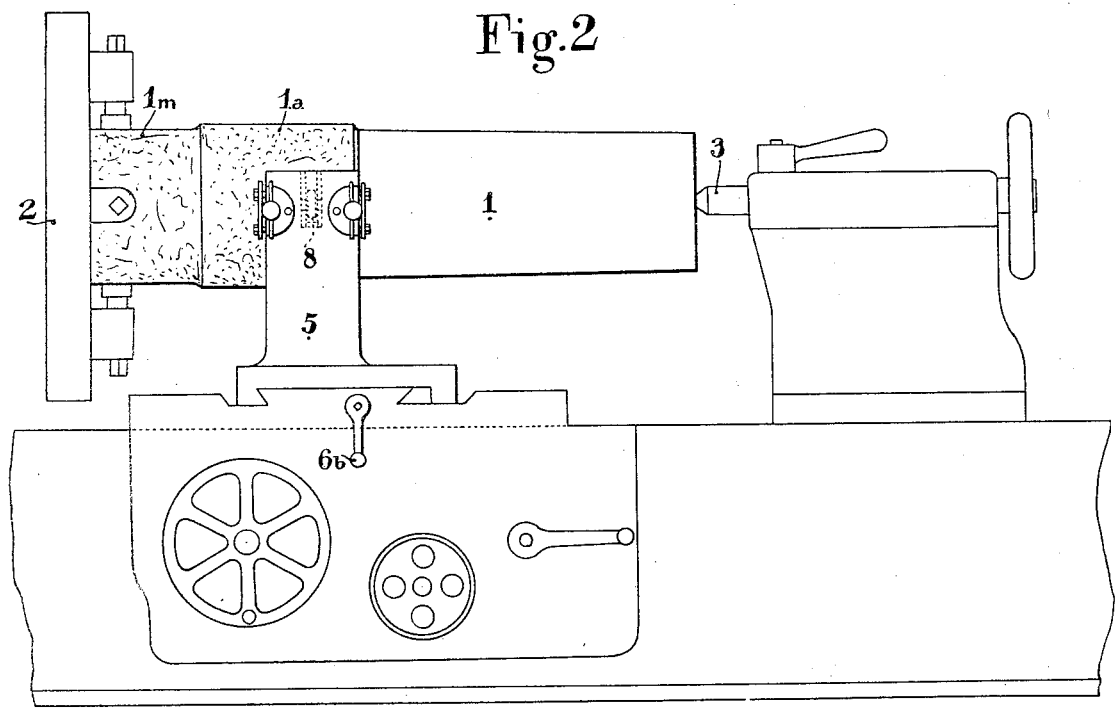
Figure 3:
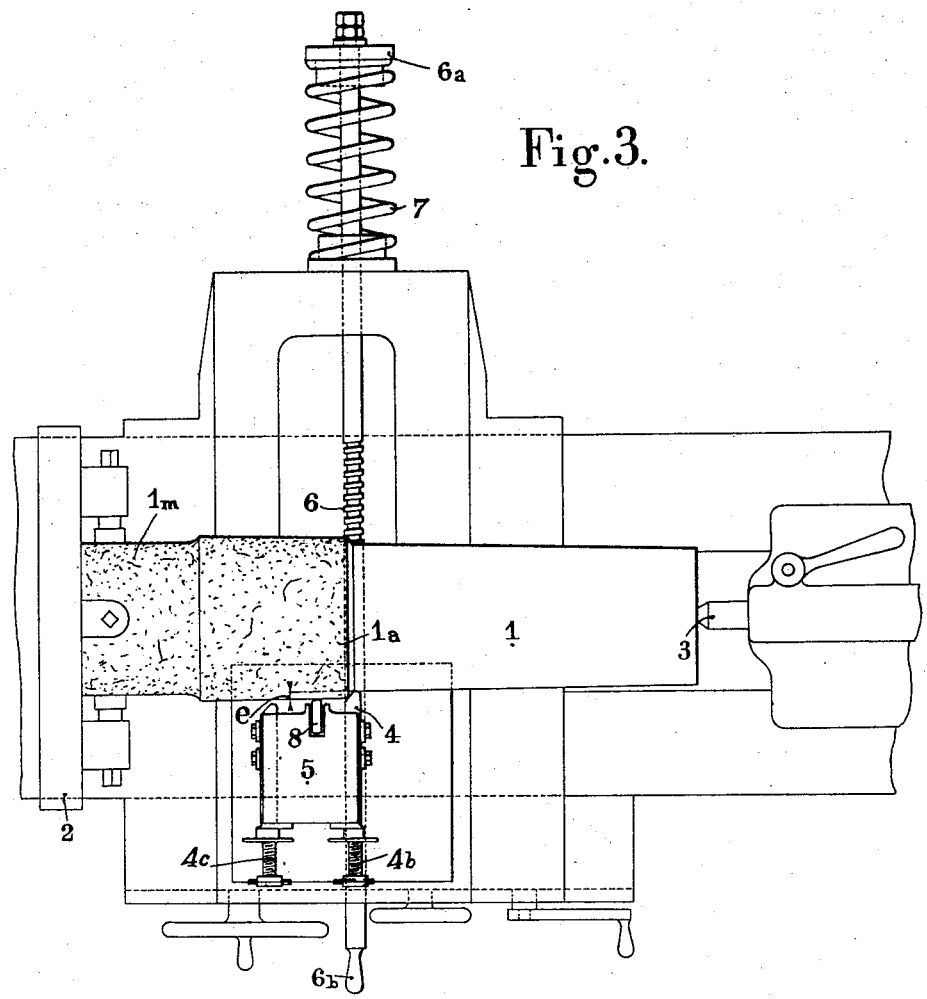

The invention will be more clearly understood from the following description, with reference to the diagrammatic accompanying drawings, given by way of example only, and in which:

Figs. 1 to 3, which illustrate the entire lathe, are respectively an end view, a side view and a plan view of the same.

Figure 4:
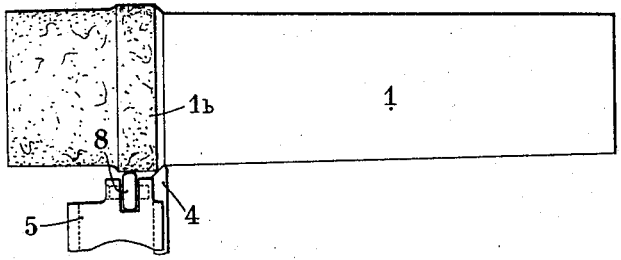
Figure 5:
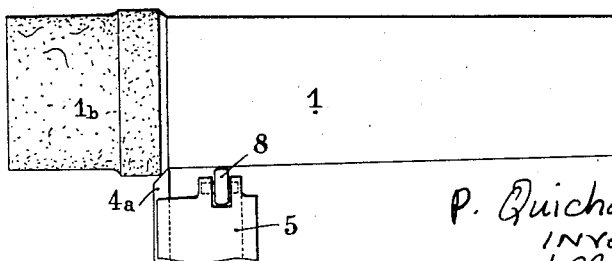

Figs. 4 and 5 are diagrammatic plan views showing the method of mounting the tool at the end of the first cut and at the beginning of the second cut, respectively.

In the drawings, 1 designates an ingot to be rough turned.

This ingot is mounted on a lathe, or on any other machine capable of effecting the operation to be hereinafter described.

In the case given as example, the said ingot is held by its dead or discard lead 1m, on the face plate 2 of the lathe, by means of stops and, at the other end, it is carried at its center by the back centre 3.

The roughing out operation is effected by means of a tool 4 which is mounted on a tool-carrier 5 free on its slide so as to be able to move at right angles to the axis of the ingot.

At the lower part, the carriage carries a nut 5a in which is screwed a screw 6 perpendicular to the axis of rotation of the work; at the end of this screw is threaded a spring 7 which, being compressed between the frame and a bearing washer 6a secured on the screw, constantly urges the tool-carrier towards the ingot.

On the other hand, on the tool-carrier is mounted a roller 8 preferably placed as near as possible to the tool 4, in front of the latter.

The roughing out operation takes place as follows:

The roller 8 is moved in contact with the end of the ingot which is carried by the back centre 3, and the position of the tool 4 is adjusted in such a manner that it extends beyond the tool to an extent e corresponding to the thickness of the superficial layer to be removed.

The automatic longitudinal clamping mechanism ensuring the feed of the tool is so adjusted as to ensure the desired width of cut, and the roughing out operation automatically takes place on an approximately constant thickness, the tool being guided by the roller bearing on the portion 1a of the ingot which is not yet roughened out.

The machine is stopped when the roller reaches the edge of the dead or discard head. At this moment there still remains a portion 1b which is not roughened out (Fig. 4), and the following arrangement is provided for roughing out the same:

The carriage is moved back towards the right of the tool, that is to say towards the portion already roughened out, the tool 4 is withdrawn within its housing and replaced by a tool 4a placed in front of the roller 8, at the same level as the latter (Fig. 5).

The longitudinal feed mechanism is re-started and the roughing out operation is thus completed, the tool 4a being guided, during this second cut, by the roller 8 which bears on the portion of the ingot already roughened out.

The depth of cut can be adjusted by means of screws 4b or 4c or equivalent devices adapted to control the distance by which the tools project beyond the roller 8.

It is to be understood that any arrangements equivalent to that just described can be provided for effecting these two phases of the roughing out operation with guiding alternately on the non-roughened out portion and on the roughened out portion of the ingot: a single tool can for instance be provided, this tool being placed between two rollers which can be alternately put in operative and in inoperative position, and the passage from one phase to the other can take place at any moment; moreover, the method of mounting the tool-carrier, the returning device with which it cooperates, the arrangement of the abutment serving to guide the tool, etc. . ., can be modified in any suitable manner, without departing from the scope of the invention; furthermore, instead of a lathe tool, use can be made, as above stated, of any other convenient tool suitably driven; finally, several of the roughing out devices can be mounted and simulatneously employed on one and the same machine.

I claim:

1. In a device for skinning a rough metal part of any kind rotatably mounted on a machine tool, a cutting tool and a guide roller, a tool carrier on which said cutting tool and guide roller are mounted, means for moving said tool carrier parallel to the axis of rotation of said part and positively transversely of said axis of rotation, means for urging said tool carrier toward said part and means for independently adjusting the distance of the cutting tool and of the guide roller from the axis of rotation of the part, whereby the cutting tool may be guided to and from the axis of rotation in accordance with the conformation of the work.

2. In a device for skinning a rough metal part of any kind rotatably mounted on a machine tool, a cutting tool and a guide roller, a tool carrier on which said cutting tool and guide roller are mounted with the point of the cutting tool, the axis of the guide roller and the axis of rotation of said part in one plane, means for moving said tool carrier parallel to the axis of rotation of said part and positively transversely of said axis of rotation, means urging said tool toward said part and means for independently adjusting the distance of the cutting tool and of the guide roller from the axis of rotation of the part, the guide roller being of slight thickness and located close to the cutting tool.

3. The device according to claim 2, in which means are provided for supporting the cutting tool either before or behind the guide roller whereby the guide roller will bear on the rough portion of the part or on the cut portion of the part as may be desired.

4. The device according to claim 2, in which one cutting tool is mounted ahead of the guide roller and one cutting tool mounted behind the guide roller with the cutting points in the same plane and independent means for positively moving each cutting tool toward or away from the axis of rotation of the part.

PAUL QUICHON.